H. HESS.
JOURNAL BEARING.
APPLICATION FILED APR. 27, 1906.
1,146,875.
Patented July 20, 1915.
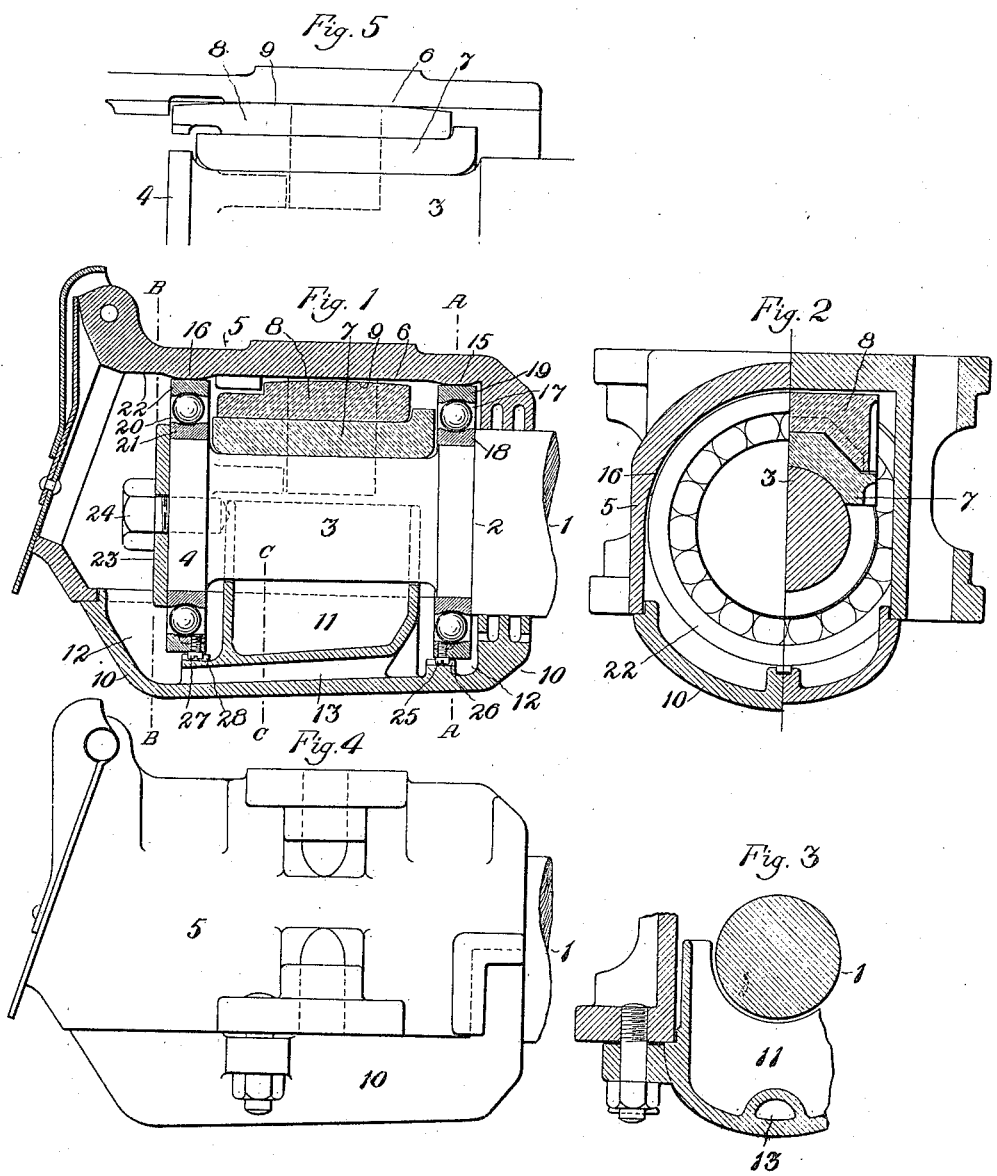
WITNESSES
Lilian Brock
Nancy E. Costello
INVENTOR
Henry Hess
by Brock Smith
Attorneys.

UNITED STATES PATENT OFFICE.

HENRY HESS, OF PHILADELPHIA, PENNSYLVANIA, ASSIGNOR TO THE HESS-BRIGHT MANUFACTURING COMPANY, OF PHILADELPHIA, PENNSYLVANIA, A CORPORATION OF DELAWARE.

JOURNAL-BEARING.

1,146,875.  Specification of Letters Patent.  Patented July 20, 1915.

Application filed April 27, 1906. Serial No. 313,977.

*To all whom it may concern:*

Be it known that I, HENRY HESS, a citizen of the United States, and a resident of Philadelphia, in the county of Philadelphia and State of Pennsylvania, have invented a new and useful Journal-Bearing, of which the following is a specification.

My invention relates particularly to the combination in a single bearing of plain and roller bearings. A wide and important field of application of such journals is to railway car axles, and I describe my invention herein as applied to a car journal-box of standard type. It must be understood, however, that I contemplate the use of the invention in any other application where it will give advantageous results.

The advantages of the use of my combination journal bearing in such locations as car journal-boxes, are important. The roller bearing, or bearings, normally carry the entire load, and the plain bearing is held in reserve, out of action, and causing a negligible amount of friction, or none. In the event of breakage or failure from any cause of one of the roller bearings the plain bearing will come into action and satisfactorily carry the load.

An important part of my invention also consists in the adaptation of this combined bearing to a standard form of journal box, such, for instance, as the Master Car Builders' box, preserving the general arrangement of the plain bearing commonly employed in such journals, with slight changes, principally dimensional.

A further important feature lies in the provision of bearing mountings such that the load upon different bearing parts is equalized under different conditions, such for instance, as when the axle is tilted by inequalities in the rails, etc.

This and other characteristics and advantages of my invention are discussed more fully hereinafter in connection with the accompanying drawing which illustrates an exemplification of the invention as applied to a standard car journal, and in which—

Figure 1 is a vertical longitudinal section through a standard car journal box; Fig. 2 is a cross section of the same, the right half taken on the line A A, and the left half on the line B B of Fig. 1; Fig. 3, a fragmentary cross section taken on the line C C, Fig. 1; Fig. 4, a side elevation of the journal box; and Fig. 5, a fragmentary diagram showing the shape and position of the bearing brasses as commonly used in a journal box of the type shown.

1 designates an axle; 2, a shoulder thereon; 3, a reduced part of the axle forming a plain journal; 4, the outer end of the axle; 5, a journal box which may be of standard construction, such as the Master Car Builders' standard box; 6, the inner top surface thereof; 7, a plain journal "brass" resting upon the plain journal 3; 8, an intermediate brass supporting the brass 7 and having a curved upper face 9, such as is frequently provided in car journals for a purpose well understood in the art; 10, a bottom piece suitably secured to the journal box proper; 11, a cup provided in the bottom piece 10, partly surrounding the axle, as best seen in Fig. 3, and constituting a receptacle for any desired lubricant or packing, such, for instance, as is commonly used in car journals; 12, a cup formed by the bottom piece 10 and constituting a receptacle for any suitable lubricant for the roller bearing, preferably separate from the cup 11; 13, a passage unconnected with cup 11, affording a communication between different parts of the cup 12.

The parts so far described constitute, as may be best seen by a comparison with Fig. 5, a plain journal bearing conformable to standard practice. The journal surface and the brasses are somewhat shortened up, their customary form being, however, retained. It will be seen that the upper convex surface of the intermediate brass 8 is not actually in contact with the inner upper surface of the box, and therefore there is no working pressure thrown upon the plain bearing (contact between brass 7 and journal 3).

15 is a segmental convex seat provided in the box, which may extend a greater or less distance around the inner surface of the box in contact with a member of the roller bearing, as will be later described; in the present instance as shown it extends less than one-half the inner circumference of the box; 16, a similar seat in the outer end of the box; 17, a complete roller bearing, in the present instance a ball bearing, conveniently of the non-adjustable ring type, in the inner end of the box; it must be understood that while I show a certain type of bearing, any other suitable bearing employing anti-friction members, such as cylindrical rollers, balls, etc., may be employed, as may appear desirable; 18, the inner bearing ring of bearing 17, encircling the axle and resting against the shoulder 2; 19, the outer bearing ring of said bearing, upon which rests the convex seat 15; 20, a similar roller bearing in the outer end of the box; 21, the inner bearing ring of bearing 20, encircling the part 4 of the axle; 22, the outer bearing ring thereof, upon which rests the convex seat 16; 23, a washer secured by cap screw 24 to the axle and engaging the inner bearing ring 21, which it prevents from outward displacement; 25, a screw which enters the outer bearing ring 19 of bearing 17 and serves a function which need not be here described, and of which the head projects beyond the surface of the ring; 26, a recess conveniently formed in the bottom piece 10, in which the screw head 25 rests, preventing rotation of the outer ring 19 in the journal box; 27, 28, another screw and recess similar to those described and performing a similar function for bearing 20.

It will be observed that the outer rings of bearings 17 and 20 are positively engaged by the convex seats 15, 16, and such bearings therefore normally carry the load supported by the journal box. The convex seats 15, 16, serve to permit the equalizing of the load when the axle 1 tilts in the box, since under these conditions the bearing rings rock upon these seats as a base, the necessary movement of the lower sides of the bearings being permitted by the fact that they are free from contact with the box, and by the heads of screws 25, 27, moving freely forward and back in their recesses 26, 28, although the screws at the same time continue to prevent rotation of the outer bearing rings.

Under normal conditions the plain bearing is out of service, and the brass 7 simply rests by its own weight upon the plain journal 3, causing a minimum friction. In some cases means, such as springs, may be applied to raise these plain bearing brasses from contact with the axle, but this is not essential. If, however, breakage, such as of one or more of the anti-friction members, or bearings rings, or failure of either or both of the roller bearings, from any cause, occurs, the box 5 may come into actual contact with the intermediate brass 9, and the plain bearing will take up the load and carry it as efficiently as it does in the standard bearing in present use.

I have already stated that my invention may be used in any instance in which its use is advantageous. I have set forth its advantages above as they clearly appear in its use in a car journal box, but to those properly versed in the art, its advantages in other applications, and the many and wide variations which may be made in its structure and arrangement, will appear without detailed description. Among other changes, however, I may mention that the number of roller bearings may be varied as desired; there may be more than one plain bearing if necessary, or the relative positions of the plain and roller bearings may be varied. Neither is it necessary to mount all parts of the structure in the same journal box. Separate mountings may be employed if desirable, it only being necessary that they be so related to each other that the bearing considered as a whole may perform the desired functions which have been ascribed to it.

What I claim is:

1. The combination of a journal box, a shaft, two unit-assembled roller bearings spaced apart on the shaft, the top of the box having bearing seats resting on the outer rings of the bearing, and a separate plain bearing member carried in the top of the box normally inactive but which coöperate with a plain bearing surface of the shaft between the ball bearings upon failure of the latter.

2. The combination of a journal box, an axle entering the box, two unit-assembled ball bearings each including an inner and an outer bearing ring and balls in races between the rings, the axle being provided with separated seats for the inner rings and the box having seats resting on the outer rings, and a bearing member separate from the box and freely mounted therein and intermediate the ball bearings and serving to space apart the latter, and also intermediate the box and a journal formed on the shaft between said ball bearings, whereby said separate bearing member is normally inactive but upon failure of a ball bearing will coöperate with said journal to form a plain bearing between the axle and the box.

3. In a bearing structure, the combination of a housing, an axle therein, two unit assembled ball bearings intermediate the axle and the housing serving to normally support the axle in the housing, the axle being provided with a journal intermediate the ball bearings, and a plain bearing member loosely supported in the housing adjacent to the journal and adapted to carry the load upon failure of the ball bearings.

4. In a bearing structure, the combination of a car journal box, an axle extending through an end thereof into the box, a segmental bearing member engaging the top of a journal formed upon the axle, a unit-assembled anti-friction bearing at each end of said segmental bearing member, each of said anti-friction bearings including an inner and an outer race-ring and rollers therebetween, seats for said inner and outer rings being provided upon said axle and in said box, respectively, and means acting upon failure of one or both of said anti-friction bearings to support said box upon said segmental bearing member.

5. The combination of a journal box, an axle entering the box, two ball bearings each including an inner and an outer bearing ring and balls in races between the rings, the axle being provided with separated seats for the inner rings and the box having seats resting on the outer rings, and a stationary member intermediate the ball bearings and serving to prevent displacement of the inner bearing rings toward each other.

6. The combination of a journal box, an axle entering the box, two ball bearings each including an inner and an outer bearing ring and balls in races between the rings, the axle being provided with separated seats for the inner rings and also being provided with a shoulder against which one of the inner rings rests, a member secured to the end of the axle and forming an abutment for the other inner ring, the box being provided with seats resting on the outer bearing rings and a stationary member intermediate the ball bearings and serving to prevent displacement of the inner bearing rings toward each other.

In testimony whereof I have affixed my signature in the presence of two witnesses.

HENRY HESS.

Witnesses:
 THEO. H. MCCALLA,
 C. D. MCCALLA.